(12) United States Patent
Connor

(10) Patent No.: US 7,977,807 B1
(45) Date of Patent: Jul. 12, 2011

(54) WEARABLE DEVICE TO GENERATE ELECTRICITY FROM HUMAN MOVEMENT

(75) Inventor: Robert A. Connor, Minneapolis, MN (US)

(73) Assignee: Medibotics LLC, Minneapolis, MN (US)

( * ) Notice: Subject to any disclaimer, the term of this patent is extended or adjusted under 35 U.S.C. 154(b) by 293 days.

(21) Appl. No.: 12/319,270

(22) Filed: Jan. 3, 2009

Related U.S. Application Data

(60) Provisional application No. 61/010,183, filed on Jan. 7, 2008.

(51) Int. Cl.
*H02P 9/00* (2006.01)

(52) U.S. Cl. ......................................... 290/1 R; 290/1 E

(58) Field of Classification Search ............... 290/1 R
See application file for complete search history.

(56) References Cited

U.S. PATENT DOCUMENTS

| | | | | |
|---|---|---|---|---|
| 1,506,282 | A | 8/1924 | Barbieri | |
| 3,744,053 | A * | 7/1973 | Parker et al. ................ | 2/2.16 |
| 5,167,082 | A | 12/1992 | Chen | |
| 5,358,461 | A | 10/1994 | Bailey | |
| 5,431,694 | A | 7/1995 | Snaper | |
| 5,495,682 | A | 3/1996 | Chen | |
| 6,182,378 | B1 | 2/2001 | Sendaula | |
| 6,201,314 | B1 | 3/2001 | Landry | |
| 6,239,501 | B1 | 5/2001 | Komarechka | |
| 6,255,799 | B1 | 7/2001 | Le | |
| 6,281,594 | B1 * | 8/2001 | Sarich ........................... | 290/1 R |
| 6,293,771 | B1 | 9/2001 | Haney | |
| 6,316,906 | B1 | 11/2001 | Lozada | |
| 6,433,465 | B1 | 8/2002 | McKnight | |
| 6,709,778 | B2 | 3/2004 | Johnson | |
| 6,737,789 | B2 | 5/2004 | Radziemski | |
| 6,744,145 | B2 | 6/2004 | Chang | |
| 6,822,343 | B2 * | 11/2004 | Estevez ........................ | 290/1 R |
| 6,982,497 | B2 | 1/2006 | Rome | |
| 7,005,757 | B2 | 2/2006 | Pandian | |
| 7,081,683 | B2 | 7/2006 | Ariav | |
| 7,081,699 | B2 | 7/2006 | Keolian | |
| 7,129,592 | B1 | 10/2006 | Yetter | |
| 7,233,829 | B2 | 6/2007 | Vlad | |
| 7,249,805 | B2 | 7/2007 | Cap | |
| 7,266,396 | B2 | 9/2007 | Terzian | |
| 7,304,416 | B2 | 12/2007 | Mullen | |
| 7,327,046 | B2 | 2/2008 | Biamonte | |
| 7,361,999 | B2 | 4/2008 | Yeh | |
| 7,391,123 | B2 | 6/2008 | Rome | |
| 7,560,856 | B2 * | 7/2009 | Chen et al. ................... | 310/339 |
| 2003/0168861 | A1 | 9/2003 | Estevez | |
| 2004/0183306 | A1 | 9/2004 | Rome | |
| 2005/0255349 | A1 | 11/2005 | Fisher | |
| 2006/0192386 | A1 | 8/2006 | Rome | |
| 2007/0145746 | A1 | 6/2007 | Biamonte | |
| 2007/0167988 | A1 | 7/2007 | Cernasov | |

* cited by examiner

*Primary Examiner* — T C Patel
*Assistant Examiner* — Iraj A Mohandesi

(57) ABSTRACT

This invention uses hydraulic or pneumatic passageways to create a wearable, portable, washable, and relatively unobtrusive device for efficiently converting movement of a relatively large portion of the human body into electricity. This device comprises: a flowable substance; passageways through which the flowable substance flows that are worn over the exterior of the human body; and energy-converting members that convert the energy of the flow of the flowable substance into electricity.

12 Claims, 4 Drawing Sheets

WEARABLE DEVICE TO GENERATE ELECTRICITY FROM HUMAN MOVEMENT

CROSS-REFERENCE TO RELATED APPLICATIONS

Figures 1, 2:
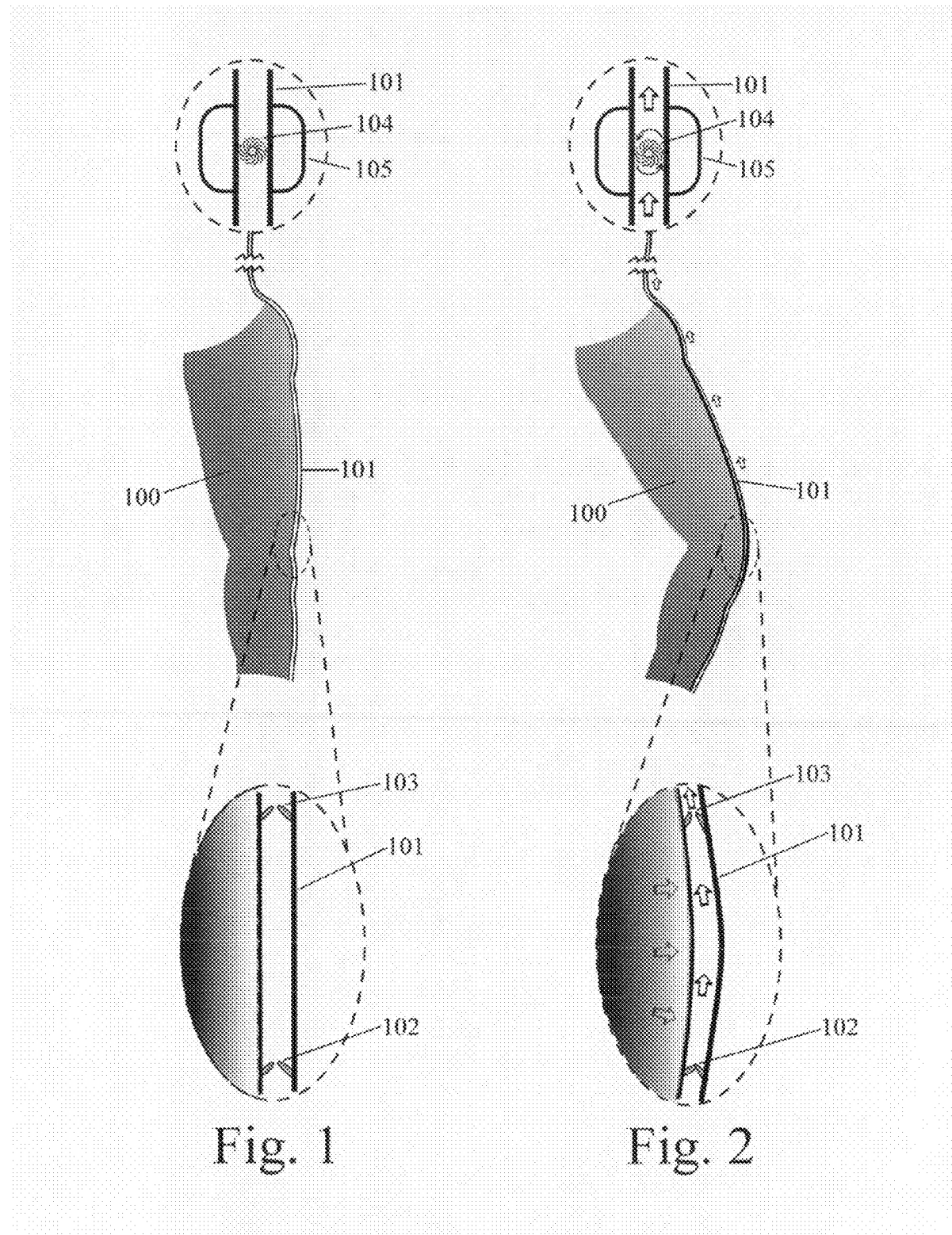

This patent application claims the priority benefit of provisional patent application Ser. No. 61/010,183 entitled "A wearable system to generate electricity and/or estimate energy expended" filed on Jan. 7, 2008 by Robert A. Connor.

FEDERALLY SPONSORED RESEARCH

Not Applicable

SEQUENCE LISTING OR PROGRAM

Not Applicable

BACKGROUND

1. Field of Invention

This invention relates to the generation of electricity from human movement.

2. Background and Related Art

With the proliferation of mobile electrical devices, there is increasing need for better methods of providing electrical power to these devices. This need has prompted a stream of research that focuses on alternative methods of mobile power generation, including methods of generating electricity from movement of the human body.

General approaches to generating electricity from movement of the human body include: (1) interaction of a human with an external piece of equipment; (2) footwear that converts energy from walking into electricity; (3) wearable fabric with electrochemical structures or reactions to convert energy from human movement into electricity; (4) gravity-based kinetic energy harvesting devices; and (5) other kinetic energy harvesting devices. Some of these approaches, such as shoe-based approaches, are well developed in the related art. Others are not yet well developed. All of the current methods based on these approaches have disadvantages.

(1) Interaction of a Human with an External Piece of Equipment

Interaction of humans with external equipment can involve humans using exercise and playground equipment, pulling levers and turning cranks, carrying backpacks, and using other methods. Such methods for generating electricity from human movement are disclosed by U.S. Pat. No. 5,358,461 (Bailey), U.S. Pat. No. 6,293,771 (Haney), U.S. Pat. No. 6,982,497 (Rome), U.S. Pat. No. 7,005,757 (Pandian), U.S. Pat. No. 7,129,592 (Yetter), U.S. Pat. No. 7,361,999 (Yeh), U.S. Pat. No. 7,391,123 (Rome), and applications 20040183306 (Rome) and 20060192386 (Rome). Disadvantages of this general approach include: methods with significant size equipment are not portable; those that require specific actions by body members (such as hand pulling) do not leave those members free for other activities; and it is difficult to harvest energy from a large portion of body movement without a large, cumbersome piece of equipment.

(2) Footwear that Converts Energy from Walking into Electricity

There are many examples of shoes in the related art that convert contact energy from walking or running into electricity. These examples include U.S. Pat. No. 1,506,282 (Barbieri), U.S. Pat. No. 5,167,082 (Chen), U.S. Pat. No. 5,495,682 (Chen), U.S. Pat. No. 6,182,378 (Sendaula), U.S. Pat. No. 6,201,314 (Landry), U.S. Pat. No. 6,239,501 (Komarechka), U.S. Pat. No. 6,255,799 (Le), U.S. Pat. No. 6,281,594 (Sarich), U.S. Pat. No. 6,744,145 (Chang), U.S. Pat. No. 7,327,046 (Biamonte), and application 20070145746 (Biamonte). Disadvantages of shoes that convert energy from walking into electricity include: such shoes do not capture energy from upper legs or the entire rest of the body; shoes that harvest energy from contact with a support surface do not work in zero-gravity environments or low-contact environments such as water; and shoes with moving elements on the sole may interfere with balance and traction.

(3) Wearable Fabric with Electrochemical Structures or Reactions

Some approaches to generating electricity from human body movement use electrochemical structures or reactions, such as piezoelectric or hydrogen-based generators. Examples of such approaches in the related art include U.S. Pat. No. 6,433,465 (McKnight), U.S. Pat. No. 6,709,778 (Johnson), U.S. Pat. No. 6,737,789 (Radziemski), U.S. Pat. No. 7,081,699 (Keolian), U.S. Pat. No. 7,304,416 (Mullen), U.S. Pat. No. 7,249,805 (Cap), and application 20050255349 (Fisher). Disadvantages of using electrochemical methods such as these include: to date they create very small amounts of electricity; and many of the electrochemical structures are not washable.

(4) Gravity-Based Kinetic Energy Harvesting Devices

Some approaches to generating electricity from human body movement harvest kinetic energy through the force of gravity on a moving object. For example, a cell phone carried by a human often moves around and a free-moving member within that phone will move relative to the phone due to the pull of gravity. This relative motion can be harvested into electricity to power the phone. U.S. Pat. No. 6,316,906 (Lozada) and U.S. Pat. No. 7,266,396 (Terzian) disclose such approaches. Disadvantages of this approach include: they harvest relatively small amounts of energy; and it is difficult to use such approaches to capture energy from large portions of the human body.

(5) Other Kinetic Energy Harvesting Devices

The related art also includes non-gravity-based approaches to converting kinetic energy from human movement into electricity. For example, methods that convert the pulsing action of a blood vessel into electricity are disclosed in U.S. Pat. No. 5,431,694 (Snaper), U.S. Pat. No. 7,081,683 (Ariav), and application 20070167988 (Cernasov). Converting energy from blood vessel pulsation is limited in terms of the amount of electricity and is limited in external applications by the proximity of blood vessels to the body surface. Another interesting invention involving harvesting energy is U.S. Pat. No. 7,233,829 (Vlad) which discloses a shark-repelling wet suit with an electric field.

U.S. Pat. No. 6,822,343 (Estevez) and application 20030168861 (Estevez) disclose a device for obtaining electricity from fluid flow between an inner passage closer to the body and outer passage farther from the body. A major disadvantage of this approach is that body movement, such as the knee bending, will bend and pressurize both the inner and outer passages, so the pressure differential between inner and outer passages is much less than the pressure differential between two sequential passages along the body surface, one in the area being bent and the other in a non-bending area. With overlapping inner and outer passages, much of the energy from bending is not captured. Another disadvantage of overlapping inner and outer passages is the resulting double thickness. Double thickness can be cumbersome when one is striving to make an electricity-generating garment as unobtrusive as possible. As another disadvantage, when a generator is sandwiched between an inner and outer layer, it is not easy to remove and replace the generator so that the garment can be washed.

(6) Summary of the Background and Related Art

Although there has been a good deal of creative work toward generating electricity from human movement, the current methods all have disadvantages. There remains a need for a wearable, portable, washable, and relatively unobtrusive device that can efficiently convert movement of a relatively large portion of the human body into electricity. That is what this present invention does.

SUMMARY

This invention uses hydraulic or pneumatic passageways to create a wearable, portable, washable, and relatively unobtrusive device for efficiently converting movement of a relatively large portion of the human body into electricity. The components of this device include: flow passageways (such as lumens or bladders) that are worn externally on the body; a flowable substance (such as a liquid or gas) within these flow passageways that is moved by body motion; and one or more electricity generators driven by flow of the flowable substance.

These flow passageways can be part of flow circuits with one-way valves. As the body moves, the walls of the flexible flow passageways intermittently compress, interacting with the one-way valves to pump the flowable substance into circulation around the circuit. This circulation can rotate a turbine which drives a generator to create electricity. In an example, these components can be worn by incorporating them into clothing. Since the flexible flow passageways would probably not be harmed by immersion in water, this system may be washable—especially if the generator can be detached before washing and reattached after washing.

In the examples discussed herein, the invention has a single-layer system of non-overlapping passageways and flows that are generally parallel to the surface of the body. There are likely to be greater differences in compression between different sections of non-overlapping passageways (since they cover different sections of the body surface) than between overlapping inner and outer passageways (since they both cover the same section of the body surface). Accordingly, this invention focuses on generation of electricity from flows between sections of single-layer non-overlapping passageways, not from flows perpendicular to the body surface between inner and outer passageways.

DRAWINGS

Introduction

FIGS. 1 through 6 show some examples of how this invention may be embodied, but do not limit the generalizability of the claims which may be embodied in other ways.

FIGS. 1 and 2 show one example of how this invention may be used to convert body movement into electricity, focusing on just one passageway over just one body part (the leg in this example). FIG. 1 shows different views of one passageway (a compressible tube with one-way valves) that is attached to a leg. The passageway continues upward from the leg to a section containing a turbine and generator. In this example, this one tube is part of a system of many tubes spanning the body, but only one tube is shown in FIGS. 1 and 2 to focus on the specifics of how it works. The full system of tubes is shown in later figures. FIG. 1 shows the tube in this example before the knee bends. FIG. 2 shows the tube in this example after the knee bends.

Figure 3:
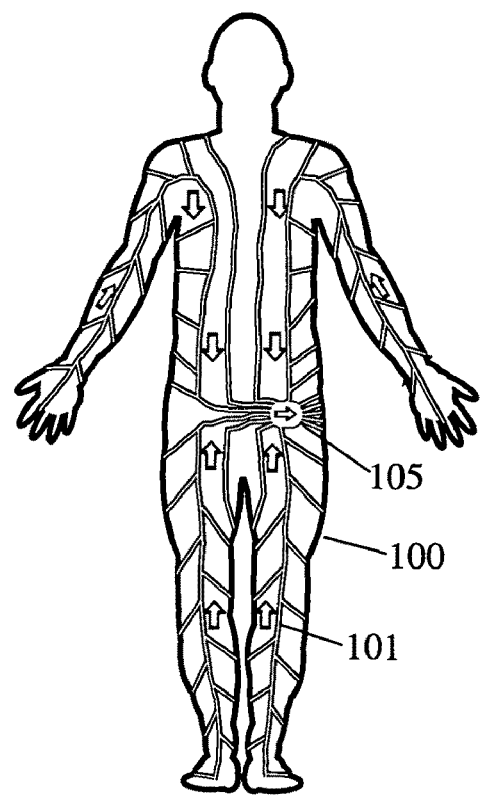
Figure 4:
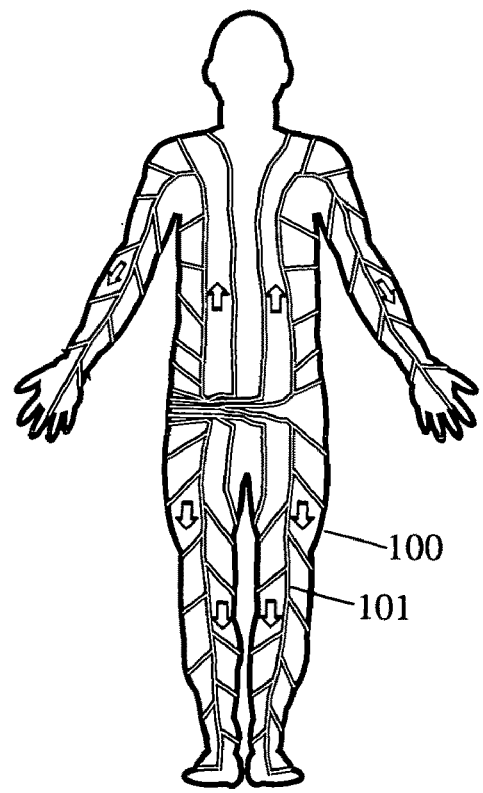

FIGS. 3 and 4 show one example of how the one tube in FIGS. 1 and 2 could be part of a system of many tubes that form an overall system of flow circuits spanning much of the body. In this example, there is a single generator at a place where all the flow circuits converge. In a variation on this example, this system of flow circuits could be incorporated into a full-body garment and the generator may be detachable so the garment can be washed. FIG. 3 shows the pattern of these flow circuits on the front of the body. FIG. 4 shows the pattern of these flow circuits on the back of the body.

Figure 5:
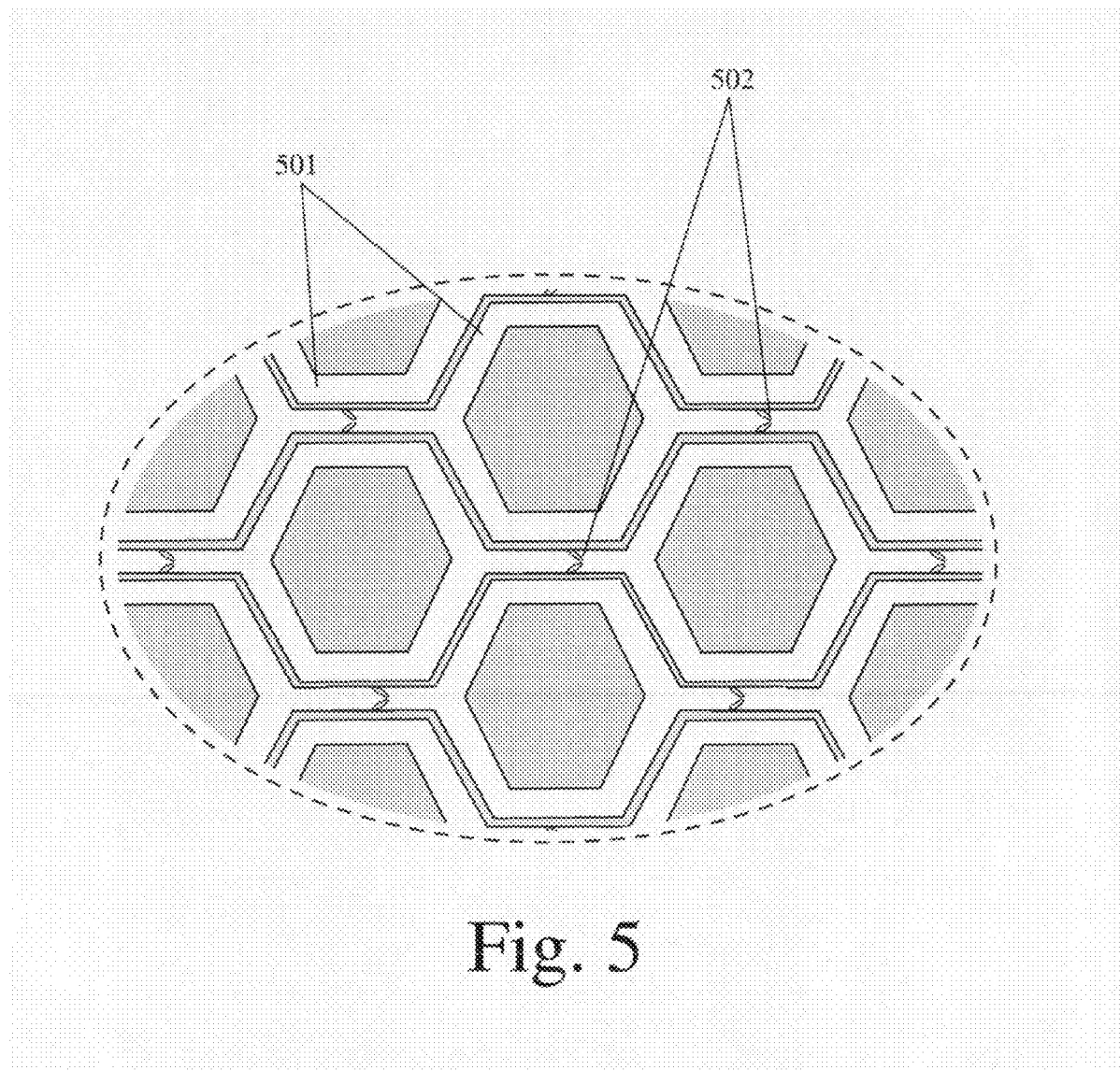

FIG. 5 shows another example of a structure for passageways filled with flowable substances, as an alternative to the basically linear tube shown in FIGS. 1 and 2. The passageways may be an interconnected repeating geometric pattern of compressible lumens. In this example, the passageways are interconnected substance-filled hexagonal lumens with one-way valves.

Figure 6:
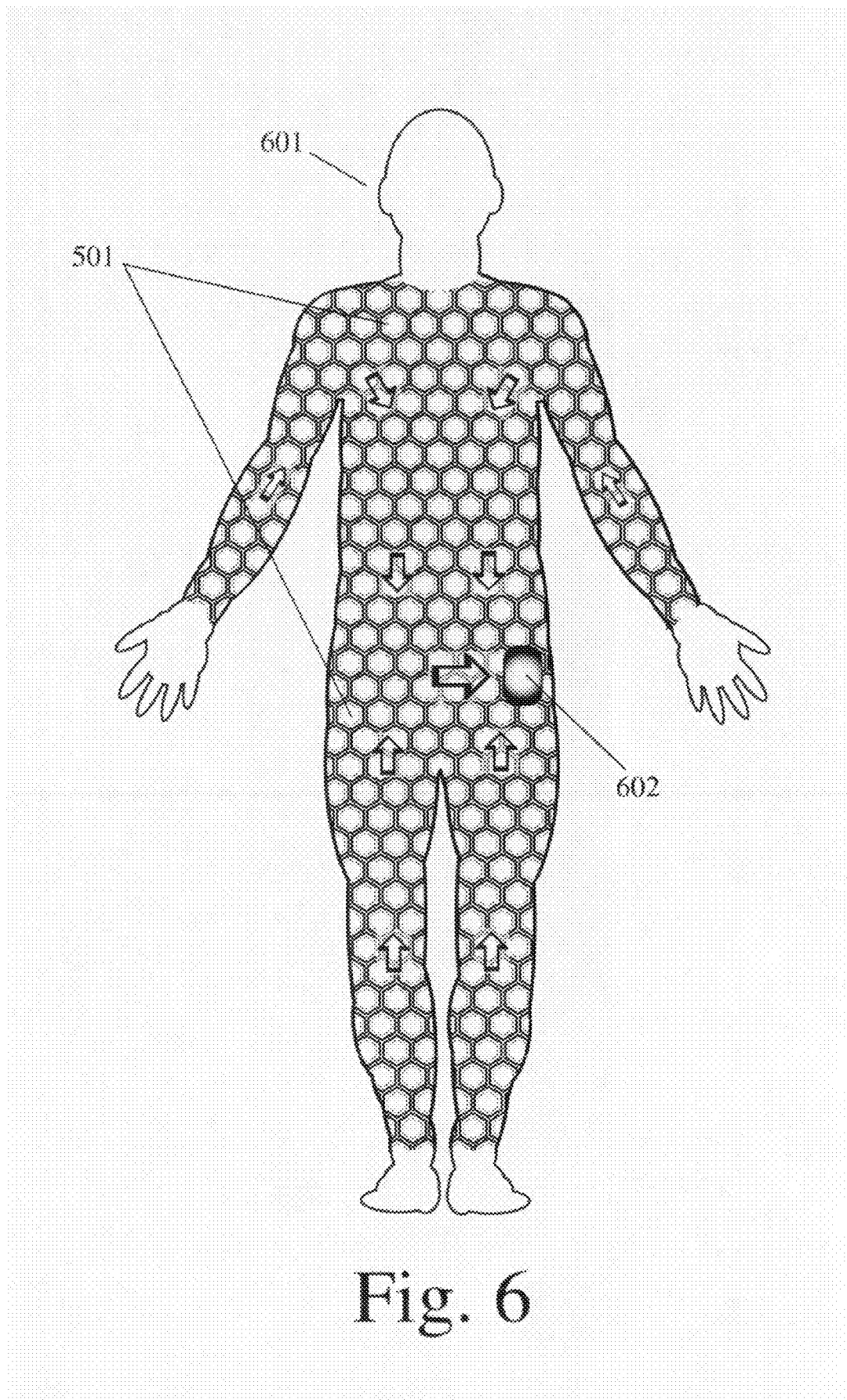

FIG. 6 shows a conceptual image of how a large portion of the body may be covered by a form-fitting garment that incorporates flow circuits made with the hexagonal lumens shown in FIG. 5. In FIG. 6, there is a single generator, assuming that the flows from all of the hexagonal lumens converge in that location. In this example, this flow convergence can be achieved by having the one-way valves connecting the hexagonal lumens on the front of the body direct flows toward the generator, having one-way valves connecting the hexagonal lumens on the back of the body direct flows away from the generator, and having the front and back circuits connect around the periphery of the body. Other configurations are also possible.

DETAILED DESCRIPTION

FIGS. 1 through 6 show some examples of how this invention may be embodied, but do not limit the generalizability of the claims which may be embodied in other ways.

FIG. 1 provides different perspectives of an example of how this invention can be used to convert body movement into electricity, focusing on the details of one particular passageway covering one part of the body. As shown in later figures, this one passageway would be part of an overall system of many passageways covering much of the body.

Specifically, FIG. 1 shows different perspectives of a fluid-filled compressible tube (101) with one-way valves (102 and 103) that is attached to the front of leg (100). In this example, the tube is latex with a diameter of 3⁄8" and the one-way valves are made of silicone rubber. The compressible tube leads upwards from leg (100) to a section containing a turbine (104) rotated by flow within the tube and a generator (105) driven by rotation of the turbine (104).

The middle portion of FIG. 1 shows a side view of leg (100) with compressible tube (101) attached to the front of the leg. Tube (101) may be attached to leg (100) in different ways. In the related art, there are many different methods to incorporate longitudinal elements into clothing, including weaving, fabric pockets and tracks, and direct adhesion. Any of these methods could be used to hold passageways along the surface of the body.

The bottom portion of FIG. 1 shows an enlarged oval perspective on one section of tube (101) where it covers the knee of leg (100). This enlarged oval perspective shows two one-way valves (102 and 103) within the tube in this section. In FIG. 1, leg (100) is not bent, so tube (101) is not compressed and the one-way valves (102 and 103) are loosely open. Before body movement, there is no tube compression, no flow of substance through the tube, no rotation of the turbine and no electricity generated. In this example, there could be other one-way valves along the tube leading upwards from the knee to the turbine and generator to help direct flow in a single direction.

The top portion of FIG. 1 shows an enlarged oval perspective on the section of the tube (101) containing the turbine (104) and associated generator (105). In this example, the section including the turbine (104) and generator (105) could be worn on a belt or, if sufficiently small, incorporated into a fabric pouch in a garment. The zig-zag lines shown interrupting the ascending tube (101) between the middle and top portions of FIG. 1 indicate a discontinuity in the location and scale between the perspectives of the middle and top portions of the figure. The oval perspective of the top section is enlarged.

FIG. 1 shows this example from three perspectives before the knee bends. FIG. 2 shows the same example from the same three perspectives after the knee bends. In FIG. 2, the knee of leg 100 bends forward, stretching and compressing tube 101, closing one-way valve 102, further opening one-way valve 103, forcing the flowable substance in an upward flow through tube 101 to turbine 104, rotating turbine 104, which drives generator 105, which generates electricity.

In this example, this flow could be part of a self-contained loop. The portion of the tube exiting the top of the section with the turbine (104) and generator (105) could loop around the back of the body, come up the front of the leg (100) and connect to the bottom portion of the tube entering the enlarged oval section on the bottom portion of FIGS. 1 and 2. Cyclical and/or sequential compression of different segments along the flow circuit are likely to make the flowable substance circulate repeatedly around the entire circuit. In an alternative example, such as if the flowable substance within the tube is air, then the tube need not be a self-contained loop. It could have an air-intake below the lower section and an air-outtake above the upper section.

In this example, there is one flow circuit associated with one turbine and generator. In an alternative example, there may be multiple flow circuits and flow circuit branches leading to and from a central turbine and generator. In a variation on this later concept, in a garment with multiple tube passageways but only one central turbine and generator, the turbine and generator may be detached and reattached from the system. This could allow the garment to be washed because the tubes would not be harmed by washing. This could be a significant advantage over energy conversion systems that involve electronics and electrochemical materials that are harmed by washing and are distributed throughout the garment.

FIGS. 1 and 2 show close-up perspectives of a single passageway. FIGS. 3 and 4 now show one example of how the tube in FIGS. 1 and 2 can be part of a system of many tubes that form an overall system of flow circuits spanning much of the body. Coverage of a large portion of the body is particularly useful for maximum generation of electricity and is an advantage over much of the related art.

FIG. 3 shows a system of tubular passageways (101) branching out across the front of the body of which leg (100) is a part. FIG. 4 shows the corresponding system of tubular passageways (101) on the back of the body. In this example, the passageways are a closed-loop system wherein flows are generally toward a single generator (105) on the front of the body, generally away from the generator on the back of the body, and front and back branches generally connect around the lateral periphery of the body.

Some of these passageways may link in series. Others may link in parallel. The passageways may be designed to most-thoroughly cover selected joints, muscles, or areas. There is a wide variety of possible circuit patterns using these conceptual elements. The patterns shown in FIGS. 3 and 4 are just one among many possible patterns.

FIG. 5 provides an oval-shaped perspective of another example of a structure for passageways filled with flowable substances which may be an alternative to the linear tube shown in FIGS. 1 and 2. The passageways may form an interconnected, repeating geometric pattern of compressible lumens (501) with one-way valves (502). In this example, the passageways are hexagonal lumens.

FIG. 6 provides a conceptual view of how a large portion of the body (601) may be covered by a form-fitting garment that incorporates the hexagonal lumens (501) shown in FIG. 5. In FIG. 6, there is a single generator (602), assuming that the flows from all of the hexagonal lumens converge in that location. One way to achieve this flow convergence is to have the one-way valves within hexagonal lumens on the front of the body direct flows toward the generator, have one-way valves within hexagonal lumens on the back of the body direct flows away from the generator, and have the front and back circuits connect to each other around the periphery of the body.

Clothing made with a continuous, repeating geometric pattern such as shown in FIGS. 5 and 6 may have advantages. For example, it may offer more-uniform sensitivity to motion across the body and be easier to manufacture than clothing with a branching design such as in FIGS. 3 and 4. However, there may also be disadvantages. For example, it may be difficult to get all the circuits to converge on one location if one wants clothing with a single generator. Also, uniform motion sensitivity may not be the optimal design for capturing full motion force from localized, large-muscle movements. One may want larger, strategically-placed flow passageways over those muscle areas.

I claim:

1. A wearable device that generates electricity from human movement to provide electrical power for mobile electrical devices, comprising:
    one or more flowable substances,
    one or more passageways through which flowable substance flows, wherein these passageways are worn over at least some portion of the exterior of the human body, and wherein there are one or more flow-directing structures that affect the direction of the flow of the flowable substance through these passageways, wherein the one or more flow-directing structures are one-way valves, and wherein, as the body moves, the walls of the passageways intermittently compress, interacting with the one-way valves to pump the flowable substance into circulation; and
    one or more energy-converting members: wherein each energy-converting member converts energy from the flow of flowable substance into electricity; wherein this flow is between two or more passageways, or between segments of a single passageway, that are substantially the same distance from the body surface; and wherein movement of the human body, independent of contact with a support surface such as the ground or floor, moves the passageways which causes the flowable substance to drive the energy-converting member which generates electricity.

2. The wearable system in claim 1 wherein the one or more flowable substances are selected from the group consisting of a liquid, gas, and gel.

3. The wearable system in claim 1 wherein the one or more passageways are selected from the group consisting of a hollow thread, tube, mesh, bubble, pouch, and bladder.

4. The wearable system in claim 1 wherein the one or more passageways are worn directly on the body or worn indirectly as incorporated into one or more articles of clothing by sewing, weaving, adhesion, or other means.

5. The wearable system in claim 1 wherein an energy-converting member includes a turbine and an electric generator powered by rotation of that turbine and wherein this energy-converting member can be detached and reattached from the system, so that the system can be washed.

6. The wearable system in claim 1 wherein the two passageways on either side of the energy-converting member are: both located at substantially the same distance from the body surface and are both substantially parallel to the body surface; or are both located at substantially the same distance from the body surface and are not substantially parallel to the body surface.

7. A wearable system that generates electricity from human movement to provide electrical power for mobile electrical devices, comprising:
  one or more flowable substances,
  one or more passageways through which flowable substance flows, wherein these passageways are worn over at least some portion of the exterior of the human body except the feet, and wherein there are one or more flow-directing structures that affect the direction of the flow the flowable substance through these passageways, wherein the one or more flow-directing structures are one-way valves, and wherein, as the body moves, the walls of the passageways intermittently compress, interacting with the one-way valves to pump the flowable substance into circulation; and
  one or more energy-converting members: wherein each energy-converting member converts energy from the flow of flowable substance into electricity; wherein this flow is between two or more passageways, or between segments of a single passageway, that are substantially the same distance from the body surface; and wherein movement of the human body moves the passageways which causes the flowable substance to drive the energy-converting member which generates electricity.

8. The wearable system in claim 7 wherein the one or more flowable substances are selected from the group consisting of a liquid, gas, and gel.

9. The wearable system in claim 7 wherein the one or more passageways are selected from the group consisting of a hollow thread, tube, mesh, bubble, pouch, and bladder.

10. The wearable system in claim 7 wherein the one or more passageways are worn directly on the body or worn indirectly as incorporated into one or more articles of clothing by sewing, weaving, adhesion, or other means.

11. The wearable system in claim 7 wherein an energy-converting member includes a turbine and an electric generator powered by rotation of that turbine and wherein this energy-converting member can be detached and reattached from the system, so that the system can be washed.

12. The wearable system in claim 7 wherein the two passageways on either side of the energy-converting member are: both located at substantially the same distance from the body surface and are both substantially parallel to the body surface; or are both located at substantially the same distance from the body surface and are not substantially parallel to the body surface.

* * * * *